US011068405B2

(12) United States Patent
Armangau et al.

(10) Patent No.: US 11,068,405 B2
(45) Date of Patent: Jul. 20, 2021

(54) COMPRESSION OF HOST I/O DATA IN A STORAGE PROCESSOR OF A DATA STORAGE SYSTEM WITH SELECTION OF DATA COMPRESSION COMPONENTS BASED ON A CURRENT FULLNESS LEVEL OF A PERSISTENT CACHE

(71) Applicant: EMC IP Holding Company LLC, Hopkinton, MA (US)

(72) Inventors: Philippe Armangau, Acton, MA (US); Ivan Bassov, Brookline, MA (US); Monica Chaudhary, South Grafton, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 428 days.

(21) Appl. No.: 15/957,065

(22) Filed: Apr. 19, 2018

(65) Prior Publication Data
US 2019/0324916 A1    Oct. 24, 2019

(51) Int. Cl.
*G06F 12/0891*    (2016.01)
*G06F 3/06*    (2006.01)

(52) U.S. Cl.
CPC ........ *G06F 12/0891* (2013.01); *G06F 3/0608* (2013.01); *G06F 3/0613* (2013.01); *G06F 3/0643* (2013.01); *G06F 3/0673* (2013.01); *G06F 2212/604* (2013.01)

(58) Field of Classification Search
CPC .. G06F 12/0891; G06F 3/0608; G06F 3/0613; G06F 2212/1044; G06F 2212/502; G06F 2212/1016; G06F 2212/401
See application file for complete search history.

(56) References Cited

U.S. PATENT DOCUMENTS

| 10,324,661 | B2 * | 6/2019 | Yoon | G06F 3/061 |
|---|---|---|---|---|
| 2012/0089579 | A1 * | 4/2012 | Ranade | G06F 16/183 |
| | | | | 707/693 |
| 2014/0244962 | A1 * | 8/2014 | Arges | G06F 12/023 |
| | | | | 711/171 |

(Continued)

OTHER PUBLICATIONS

Al-Iaham, Mohammed, et al., "Comparative Study Between Various Algorithms of Data Compression Techniques," Proceedings of the World Congress on Engineering and Computer Science, 2007, WCECS, Oct. 24-26, 2007, San Francisco, USA, 11 pages.

(Continued)

*Primary Examiner* — David Yi
*Assistant Examiner* — Nicholas A. Paperno
(74) *Attorney, Agent, or Firm* — BainwoodHuang

(57) ABSTRACT

A storage processor in a data storage system includes a compression selection component that selects a data compression component to be used to compress host I/O data that is flushed from a persistent cache of the storage processor based on a current fullness level of the persistent cache. The compression selection component selects compression components implementing compression algorithms having relatively lower compression ratios for relatively higher current fullness levels of the persistent cache, and selects compression components implementing compression algorithms having relatively higher compression ratios for relatively lower current fullness levels of the persistent cache.

21 Claims, 6 Drawing Sheets

(56) References Cited

U.S. PATENT DOCUMENTS

2017/0123711 A1\* 5/2017 Kathpal ................ G06F 3/0686

OTHER PUBLICATIONS

Hasan, M.R., et al., "Comparative Data Compression Techniques and Multi-Compression Results," IOP Publishing, 5th International Conference on Mechatronics (ICOM'13), IOP Conf. Series: Materials Science and Engineering 53(2013) 012081, pp. 1-7.
Jain, Amit, et al., "A Comparative Study of Lossless Compression Algorithm on Text Data," Proc. of Int. Conf. on Advances in Computer Science, AETACS, Elsevier, 2013, pp. 536-543.
Kodituwakku, S.R., et al., "Comparison of Lossless Data Compression Algorithms for Text Data," Indian Journal of Computer Science and Engineering, vol. 1, No. 4, Dec. 2010, pp. 416-425.

\* cited by examiner

| COMPRESSION RATIO | HIGHEST → | | | LOWEST | |
|---|---|---|---|---|---|
| PERSISTENT CACHE FULLNESS THRESHOLD | 0% | 50% | . . . | 90% | ⎫ COMPRESSION COMPONENT ATTRIBUTES 200 |
| USE ON OVERWRITES | Y | Y | . . . | Y | |
| USE ON INITIAL WRITES | Y | Y | . . . | N | ⎭ |
| | COMPRESSION COMPONENT 1 <u>170</u> | COMPRESSION COMPONENT 2 <u>172</u> | . . . | COMPRESSION COMPONENT N <u>174</u> | |

AVAILABLE COMPRESSION COMPONENTS 168

Fig. 2

COMPRESSION OF HOST I/O DATA IN A STORAGE PROCESSOR OF A DATA STORAGE SYSTEM WITH SELECTION OF DATA COMPRESSION COMPONENTS BASED ON A CURRENT FULLNESS LEVEL OF A PERSISTENT CACHE

TECHNICAL FIELD

The present disclosure relates generally to intelligent data storage systems, and more specifically to technology for compressing host I/O data in a data storage system that includes automatic selection of the specific data compression component that is used to perform compression on host I/O data flushed from a persistent cache in a storage processor based on a current fullness level of the persistent cache.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O requests received from host machines. The received host I/O requests specify one or more data objects (e.g. logical disks or "LUNs") and indicate host I/O data that is to be written to or read from the data objects. The storage processors include specialized hardware and software that processes the incoming host I/O requests and that performs various data storage tasks that organize and secure the host I/O data that is received from the host machines and stored on the non-volatile data storage devices of the data storage system.

Some previous data storage systems have performed compression on the host I/O data that they receive and store for hosts, sometimes applying multiple compression algorithms In some previous systems, default compression logic implementing a default compression algorithm was used to perform compression of host I/O data, unless the length of the resulting compressed data did not fit within the blocks previously used to store the result of compressing an older version of the host I/O data. When the compressed data resulting from using the default compression logic did not fit within the previously used blocks, compression was sometimes performed again on the host I/O data using alternative compression logic that implemented a "stronger" compression algorithm than the default compression algorithm, i.e. a compression algorithm that provided a higher compression ratio than the default compression algorithm. In this way, previous data storage systems have sometimes applied multiple different compression algorithms.

SUMMARY

Previous data storage system technology for performing data compression on host I/O data has exhibited significant shortcomings. Performing data compression on host I/O data is a CPU resource intensive activity, and previous data storage systems have at times required the use of large amounts of the shared CPU resources located within their storage processors to compress the host I/O data that they store in their non-volatile storage. For some previous data storage systems, under certain load conditions, a significant percentage of the clock cycles of the shared CPU resources located in a storage processor have been required just to compress the host I/O data stored in the non-volatile storage of the data storage system. Such high consumption of CPU clock cycles solely to perform data compression within a storage processor may effectively starve out other important storage processes, and thus significantly limit the rate at which the data storage system can process received host I/O requests.

As it is generally known, the compression ratio provided by a given compression algorithm is the ratio of i) the size of a set of uncompressed data that is passed to the compression algorithm, to ii) the size of the compressed data resulting from applying the compression algorithm to that uncompressed data. For example, in the case of a compression algorithm that typically generates compressed data that is one fifth the size of the corresponding uncompressed data, the compression ratio would be 5/1. In general, compression algorithms must use higher amounts of CPU cycles to provide higher compression ratios. Accordingly, compression algorithms that provide relatively higher compression ratios must use relatively higher amounts of CPU cycles to compress the same amount of uncompressed data.

To address the above described and other shortcomings of previous technical solutions, new technology is disclosed herein that includes a compression selection component in a storage processor of a data storage system that selects a data compression component to be used to compress host I/O data that is flushed from a persistent cache of the storage processor based at least in part on a current fullness level of the persistent cache. In some embodiments of the disclosed technology, host I/O data indicated by host I/O write requests received by the storage processor from at least one host computer is initially accumulated into the persistent cache. At some point a cache flush event may be detected indicating that some number of blocks of host I/O data accumulated into the persistent cache are to be flushed from the persistent cache to at least one lower deck file system that is internal to the data storage system. In response to detection of the cache flush event, an aggregation set may be formed consisting of some number of blocks of host I/O data from within the accumulated host I/O data present in the persistent cache. Further in response to detection of the cache flush event, a current fullness level of the persistent cache may be determined. The current fullness level may, for example, be a percentage of the total size of the persistent cache that is currently being used to persistently store host I/O data.

In response to the current fullness level of the persistent cache, a compression selection component in the storage processor selects a compression component for compressing the aggregation set. The compression component is selected from a set of available compression components that are contained in the storage processor, each of which may be used to compress host I/O data that is flushed from the persistent cache. The compression components in the set of available compression components may have different compression ratios, and may each be used for a corresponding range of fullness levels of the persistent cache. The compression selection component in the disclosed technology selects compression components implementing compression algorithms having relatively lower compression ratios for relatively higher current fullness levels of the persistent cache, and selects compression components implementing compression algorithms having relatively higher compression ratios for relatively lower current fullness levels of the persistent cache. The aggregation set is then compressed using the selected compression component to obtain a compressed version of the aggregation set, prior to storing the compressed version of the aggregation set in non-volatile storage of the data storage system.

Embodiments of the disclosed technology may provide significant advantages over previous technologies. For example, as a result of selecting data compression components that implement compression algorithms having relatively lower compression ratios in response to detection of relatively higher current fullness levels of the persistent cache, because compression algorithms having relatively lower compression ratios typically use lower amounts of CPU cycles when performing data compression, the disclosed technology causes smaller amounts of CPU cycles to be used to compress host I/O data flushed from the persistent cache when the persistent cache is more full. Because less CPU cycles are used to compress host I/O data when the persistent cache is more full, more CPU cycles are available to other components of the storage processor that share the storage processor CPU resources, including a process or execution thread that flushes the persistent cache, and the persistent cache may therefore be flushed at a higher rate, preventing the persistent cache from becoming completely full, which would interfere with the successful receipt of subsequent host I/O data sent to the storage processor.

In another example, as a result of data compression components being selected that implement compression algorithms having relatively higher compression ratios in response to detection of relatively lower current fullness levels of the persistent cache, the disclosed technology generates smaller compressed data when the persistent cache is less full, and therefore reduces the amount of non-volatile storage resources that are needed to store host I/O data at such times.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

FIG. 2 is a block diagram showing an example of available compression components and associated compression component attributes in some embodiments;

DETAILED DESCRIPTION

Embodiments of the invention will now be described. It should be understood that such embodiments are provided by way of example to illustrate various features and principles of the invention, and that the invention hereof is broader than the specific example embodiments disclosed.

Figure 1:
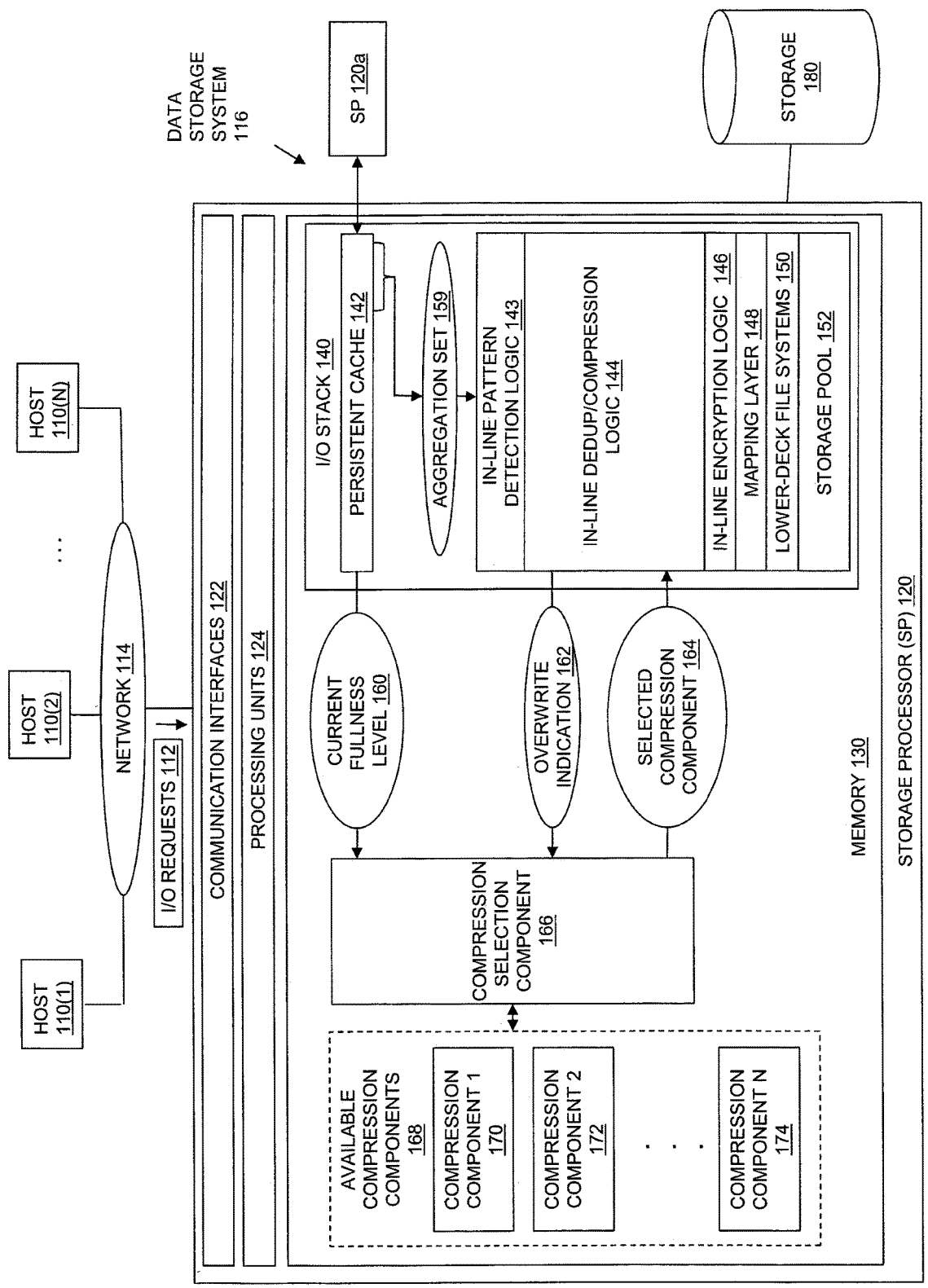
FIG. 1 is a block diagram showing an example of components in an operational environment including an embodiment of the disclosed technology.

FIG. 1 shows an example of an operational environment in which embodiments of the technology disclosed herein can operate, including an illustrative embodiment of the disclosed technology. As shown in FIG. 1, multiple host computing devices ("Hosts"), shown as devices 110(1) through 110(N), and/or host applications executing in whole or in part on devices 110(1) through 110(N), access non-volatile storage provided by a Data Storage System 116 over a Network 114. The Data Storage System 116 includes a storage processor, or "SP," 120 and Storage 180. The Data Storage System 116 may include multiple storage processors like the Storage Processor 120 (e.g., a second storage processor SP 120a). In some embodiments, multiple storage processors may be provided as circuit board assemblies, or "blades," which plug into a chassis that encloses and cools the storage processors. The chassis may have a backplane for interconnecting the storage processors, and additional connections may be made among storage processors using cables. Those skilled in the art will recognize, however, that no particular configuration of storage processors is required, as any number of storage processors, including a single storage processor, may be provided and that Storage Processor 120 can be any type of computing device capable of processing received host I/O requests.

Storage 180 within Data Storage System 116 may, for example, take the form of RAID groups, where each RAID group is composed of multiple disk drives. The disk drives in Storage 180 may include magnetic disk drives, electronic flash drives, optical drives, and/or other types of drives. In one example, each individual RAID group includes disk drives of a single type that provide similar performance. However, the disclosed technology does not require that Storage 180 be organized in RAID groups.

Network 114 may be any type of network or combination of networks, such as, for example, a storage area network (SAN), a local area network (LAN), a wide area network (WAN), the Internet, and/or some other type of network or combination of networks. The Hosts 110(1-N), and/or host applications executing in whole or in part on Hosts 110(1-N), may connect to the Storage Processor 120 using various technologies, such as, for example, Fibre Channel, iSCSI, NFS, SMB 3.0, and CIFS. Any number of Hosts 110(1-N) and/or host applications executing in whole or in part on Hosts 110(1-N) may be provided, using any of the above protocols, some subset thereof, or other protocols besides those listed. As it is generally known, Fibre Channel and iSCSI are block-based protocols, whereas NFS, SMB 3.0, and CIFS are file-based protocols. Storage Processor 120 may be configured to receive I/O Requests 112 according to both block-based and file-based protocols and to respond to such I/O requests 112 by reading or writing the Storage 180.

Storage Processor 120 may include one or more Communication Interfaces 122, a set of Processing Units 124, and Memory 130. Communication Interfaces 122 may include, for example, SCSI target adapters and network interface adapters for converting electronic and/or optical signals received over Network 114 into electronic form for use by Storage Processor 120.

The Processing Units 124 may include one or more processing chips and/or assemblies, such as one or more CPUs or the like.

Memory 130 may include both volatile memory (e.g., RAM), and non-volatile memory, such as one or more ROMs, disk drives, solid state drives, and the like. Processing Units 124 and Memory 130 together form specialized control circuitry, which is constructed and arranged to carry out specific methods and functions as described herein. Also, Memory 130 is shown including a variety of specialized software constructs that may be provided in the form of executable instructions (e.g. I/O Stack 140, Compression Selection Component 166, and/or Available Compression Components 168). When the executable instructions of the software constructs shown in FIG. 1 are executed by Processing Units 124, Processing Units 124 are caused to carry out the operations of the software constructs. Although certain specific software constructs are specifically shown in FIG. 1 and described herein, those skilled in the art will recognize that Memory 130 may further include various other types of software constructs, which are not shown, such as an operating system, various applications, processes, and daemons.

As further shown in FIG. 1, Memory 130 may include (i.e., provide by operation of programming code) the I/O stack 140. The I/O Stack 140 provides an execution path of program logic executing on Processing Units 124 for processing host I/O requests received by the Storage Processor 120, e.g. I/O Requests 112.

The I/O Stack 140 is seen to include, for example, a Persistent Cache 142, In-Line Pattern Detection Logic 143, In-Line Deduplication/Compression Logic 144, In-Line Encryption Logic 146, Mapping Layer 148, Lower-Deck File Systems 150, and Storage Pool 152. The Lower-Deck File Systems 150 store files that are used to implement data objects. For example, multiple data objects may be implemented in corresponding files stored in Lower-Deck File Systems 150. Each one of the data objects implemented by a respective file stored in one of the Lower-Deck File Systems 150 may, for example, take the form of a logical disk referred to as a LUN (Logical Unit Number), a host file system, a VVol (virtual volume, for example a virtual machine disk, e.g., as available from VMware, Inc. of Palo Alto, Calif.), a snapshot data object that is a point-in-time copy of another data object, or some other type of data object.

Mapping Layer 148 converts I/O requests directed to each one of the data objects into corresponding reads and writes of the corresponding one of the files stored in Lower-Deck File Systems 150 that implements the data object. For example, each one of the files stored in Lower-Deck File Systems 150 may have a logical address space and a set of associated addresses within the address space of the file system that contains it. The logical address space for a file may, for example, be a monotonic range of logical offsets into the file, e.g., as tracked by one or more mapping structures of the file. A mapping structure for a file may consist of, include or be part of an "inode" data structure, and may also be stored in the one of the Lower-Deck File Systems 150 that stores the file. The set of file system address space addresses associated with a file identify the blocks used by the lower-deck file system that contains the file to store the data of the file. For purposes of example, the size of each "block" may be the size of the smallest allocatable unit of storage, such as 8 KB, for example.

Persistent Cache 142 may be implemented in various specific manners such that the contents of Persistent Cache 142 is not lost in the event of a power loss, system reboot, or other similar type of event. For example, in some embodiments, Persistent Cache 142 may be implemented in whole or in part using non-volatile storage. In another example, in some embodiments Persistent Cache 142 may be implemented using DRAM (Dynamic Random Access Memory) that is mirrored to DRAM on at least one other SP (e.g., on SP 120a), and the DRAM on both SPs may be backed up by battery.

In some embodiments, Persistent Cache 142 may include or consist of a circular buffer that stores host data indicated by or included in I/O Requests 112 (e.g. host data indicated by or included in write requests received in I/O Requests 112). In some embodiments, host I/O data indicated by or included in I/O Requests 112 may be stored at a head of the circular buffer when it is received by Storage Processor 120, and subsequently flushed from a tail of the circular buffer. The circular buffer of Persistent Cache 142 may have a limited or fixed size. Accordingly, as host I/O data is added to the head of the circular buffer, it becomes more full, and as host data is flushed from the tail of the circular buffer, it becomes less full. For example, Hosts 110(1-N), and/or host applications executing on Hosts 110(1-N), may issue I/O Requests 112 to the Data Storage System 116. The Storage Processor 120 receives I/O Requests 112 at Communication Interfaces 122, and passes the I/O Requests 112 to the I/O Stack 140 for further processing. Each write request in I/O Requests 112 may specify a data object, and indicate (e.g. include) host I/O data that is to be written to the specified data object. For each one of the write requests received by Storage Processor 120, the specified host I/O data may initially be stored in Persistent Cache 142 when the write request is received by Storage Processor 120, e.g. at the head of the circular buffer. Storage Processor 120 may also provide an acknowledgment to the host that issued the write request once the host I/O data indicated by the write request has been securely stored in Persistent Cache 142. Such an acknowledgement indicates successful completion of the write request by the Data Storage System 116. The above process may be repeated for additional write requests specifying additional host I/O data to be written to various locations of the same data object. Persistent Cache 142 accumulates the host I/O data specified in these requests, e.g., at the head of the circular buffer in the order the data is received, and provides an acknowledgement in response to each request. In this way, host I/O data specified by one or more write requests directed to a data object may be accumulated over time in Persistent Cache 142. In addition, in some embodiments, host I/O data indicated for retrieval by one or more read requests in I/O Requests 112 may also be accumulated over time in Persistent Cache 142.

Each write request may specify not only the host I/O data to be written but also the location at which the specified host I/O data is to be written relative to the specified data object. For example, if the specified data object is a LUN, the write request may specify the location to be written within the LUN as an offset into the LUN. If the data object is a host file system, the write request may specify the location at which the host I/O data is to be written by file name and an offset into the named file. Mapping Layer 148 maps the specified data object to a respective lower deck file that is used to implement the data object, and also maps the various data location indicators to a set of logical offsets within that file. The lower-deck file system (e.g. one of Lower-Deck File Systems 150) that stores the file further maps these logical offsets to addresses of blocks of non-volatile storage provisioned from Storage 180. In some cases, the host I/O data to be written is directed to blocks for which non-volatile storage has already been allocated and mapped by the file system that stores the container file, such that the host I/O data overwrites previously stored blocks of host I/O data. In other cases, the host I/O data to be written is directed to locations in the file system address space to which associated physical storage has not yet been provisioned, such that the file system must allocate new blocks of non-volatile storage to the container file in order to store the received host I/O data.

At some point in the course of accumulating host I/O data that is indicated by one or more write requests into Persistent Cache 142, a cache flush event is detected, e.g. by Persistent Cache 142 or some other component of the I/O Stack 140. The cache flush event indicates that multiple blocks of host I/O data accumulated in the circular buffer of Persistent Cache 142 are to be flushed from Persistent Cache 142, e.g. to at least one lower deck file system in Lower-Deck File Systems 150, for storage through the lower deck file system into corresponding non-volatile storage within Storage 180. As a result of such flushing of host I/O data from Persistent Cache 142, an increased amount of space within the circular buffer of Persistent Cache 142 becomes available to store host I/O data indicated by subsequently received write requests. Examples of cache flush events include detecting that the circular buffer has reached or exceeded a predetermined or configured threshold maximum level of fullness (e.g. 80% full, 90% full, etc.), and/or detecting the expiration of a predetermined time period since one or more blocks of host data were stored into the circular buffer.

In response to detecting the cache flush event, Aggregation Set 159 is formed, e.g. by Persistent Cache 142 or some other part of I/O Stack 140. Aggregation Set 159 consists of a subset of the blocks of host I/O data that have been accumulated in Persistent Cache 142. The blocks of host I/O data contained in Aggregation Set 159 may, for example, consist of some number of the blocks of host I/O data that are located at a tail of the circular buffer in Persistent Cache 142, e.g. a set of the oldest blocks of host I/O data that are stored in Persistent Cache 142.

In-Line Pattern Detection Logic 143 performs pattern detection on the blocks of host I/O data in Aggregation Set 159, in order to identify blocks that contain one or more pre-determined data patterns, e.g. all zeros, etc. In the case where In-Line Pattern Detection Logic 143 determines that a block of host I/O data within Aggregation Set 159 contains a predetermined data pattern, In-Line Pattern Detection Logic 143 causes an indication of the specific data pattern to be stored in metadata associated with the location of that block, e.g. in metadata associated with the location of the block stored within Mapping Layer 148 and/or Lower-Deck File Systems 150, and no further processing of that block needs to be performed, e.g. by In-Line Deduplication/Compression Logic 144, In-Line Encryption Logic 146, etc.

In-Line Deduplication/Compression Logic 144 performs in-line data deduplication and/or in-line data compression on the blocks of host data in Aggregation Set 159. The specific type of data deduplication performed using the disclosed techniques may be any type of data duplication that involves eliminating duplicate copies of host I/O data. Accordingly, data deduplication in the disclosed technology may generally be accomplished by comparing chunks of host I/O data (e.g. blocks) to detect duplicates. For example, as it is generally known, in order to facilitate the comparison process, each chunk of host I/O data may be assigned an identification, calculated by the In-Line Deduplication/Compression Logic 144, typically using a cryptographic hash function (e.g. secure hash algorithm SHA-2 or the like). If an identification calculated for a chunk already exists, then the duplicate chunk may be replaced with a much smaller pointer to a stored copy of the corresponding host I/O data, thus reducing storage requirements for storing host I/O data received by the Storage Processor 120. In some cases, an additional verification may be performed to ensure that data with the same identification is identical prior replacement of a chunk of host I/O data with a pointer to a previously stored chunk. After data deduplication has been performed, when the deduplicated data is read back, wherever a link is found within the deduplicated data, the link is simply replaced with the stored copy of duplicate host I/O data.

The remaining blocks of host I/O data in Aggregation Set 159 that i) do not contain a predetermined data pattern detected by In-Line Pattern Detection Logic 143, and ii) do not have a crypto-digest that matches one a previously generated crypto-digest, are then compressed by In-Line Deduplication/Compression Logic 143. The specific type of data compression performed by In-Line Deduplication/Compression Logic 144 on blocks of host I/O data in Aggregation Set 159 may be any type of lossless compression that identifies and eliminates statistical redundancy or redundancies in the host data, in such a way that the resulting compressed data may be decompressed without any loss of information.

As shown in the example of FIG. 1, when In-Line Deduplication/Compression Logic 144 compresses blocks of host I/O data in Aggregation Set 159, a Current Fullness Level 160 of the Persistent Cache 142 is determined and passed to the Compression Selection Component 166. For example, the Current Fullness Level 160 of Persistent Cache 142 may be determined by Compression Selection Component 166 from Persistent Cache 142, or may be passed to Compression Selection Component 166 from Persistent Cache 142 in response to generation of Aggregation Set 159. Current Fullness Level 160 of the Persistent Cache 142 may, for example, be determined by Compression Selection Component 166 by determining a current percentage of the total size of Persistent Cache 142 that is currently used to store host I/O data. For example, in the case where Compression Selection Component 166 determines that 75% of the total data storage capacity of the Persistent Cache 142 is currently being used (e.g. is currently allocated) to store host I/O data that has already been received by Storage Processor 120 from the host machines (i.e. host I/O data indicated by write requests previously received by Storage Processor 120), and 25% of the total data storage capacity of the Persistent Cache 142 is still available (e.g. is not currently allocated) to store host I/O data that is subsequently received by Storage Processor 120 from the host machines (i.e. host I/O data indicated by write requests subsequently received by Storage Processor 120), then Compression Selection Component 166 determines that Current Fullness Level 160 is equal to 75%.

In-Line Deduplication/Compression Logic 144 may also determine whether the blocks of host I/O data in the Aggregation Set 159 that are to be compressed are an overwrite of host I/O data that was previously flushed from Persistent Cache 142 to the Lower-Deck File Systems 150. For example, in the case where the blocks of host I/O data in the Aggregation Set 159 are a modification of host I/O data that was previously flushed from Persistent Cache 142, e.g. are a write of new host I/O data to a set of blocks within a data object to which different host I/O data was previously written by a host, then the blocks of host I/O data in Aggregation Set 159 are an overwrite, and In-Line Deduplication/Compression Logic 144 passes a value of Overwrite Indication 162 to Compression Selection Component 166 indicating that the blocks of host I/O data in Aggregation Set 159 are an overwrite of previously stored host I/O data. Alternatively, in the case where the blocks of host I/O in the Aggregation Set 159 are not an overwrite of host I/O data previously flushed from Persistent Cache 142, e.g. are an initial write of host I/O data to a set of blocks within a data object to which host I/O data has not previously been written by a host, then the blocks of host I/O data in Aggregation Set 159 are an initial write, and In-Line Deduplication/Compression Logic 144 passes a value of Overwrite Indication 162 to Compression Selection Component 166 indicating that the blocks of host I/O data in Aggregation Set 159 are not an overwrite of previously stored host I/O data.

Based on the value of Current Fullness Level 160, Compression Selection Component 166 selects a compression component from Available Compression Components 168 to be used to compress the blocks of host I/O data contained in the Aggregation Set 159. Compression Selection Component 166 selects compression components from Available Compression Components 168 that implement compression algorithms having relatively lower compression ratios in response to relatively higher values of Current Fullness Level 160. Compression Selection Component 166 also selects compression components implementing compression algorithms having relatively higher compression ratios in response to relatively lower values of Current Fullness Level 160. For example, Available Compression Components 168 may include some number of compression components, shown for purposes of illustration by Compression Component 1 170, Compression Component 2 172, and so on through Compression Component N 174. Each one of Compression Components 168 may have assigned to it an associated persistent cache fullness threshold that is unique within Compression Components 168, such that the persistent cache fullness thresholds assigned to the compression components in Compression Components 168 are all different. The persistent cache fullness thresholds may be assigned to individual compression components such that compression components that implement compression algorithms having higher compression ratios, i.e. that provide greater amounts of compression with regard to the uncompressed host I/O data that they compress, are assigned lower persistent cache fullness thresholds. For example, the disclosed technology may be embodied such that the compression components in Available Compression Components 168 are ordered by decreasing compression ratios, such that Compression Component 1 170 implements a compression algorithm with the highest compression ratio of any compression component in Available Compression Components 168, and Compression Component 2 172 implements a compression algorithm with the second highest compression ratio of any compression component in Available Compression Components 168, and so on to Compression Component N 174, which implements a compression algorithm with the lowest compression ratio of any compression component in Available Compression Components 168. In such an embodiment, unique persistent cache fullness thresholds may be associated with individual compression components in Available Compression Components 168 in ascending levels of persistent cache fullness, such that Compression Component 1 170 is associated with a lowest persistent cache fullness threshold of any compression component in Available Compression Components 168, and Compression Component 2 172 is associated with a second lowest persistent cache fullness threshold of any compression component in Available Compression Components 168, and so on to Compression Component N 174, is associated with a highest persistent cache fullness threshold of any compression component in Available Compression Components 168. In such an embodiment, in response to a specific value of Current Fullness Level 160, Compression Selection Component 166 selects a compression component from Available Compression Components 168 by selecting one of the compression components in Available Compression Components 168 that has the highest associated persistent cache fullness threshold that is less than or equal to the value of Current Fullness Level 160, i.e. that has an associated persistent cache fullness threshold that is the highest persistent cache fullness threshold that is less than or equal to the current percentage of the total size of the persistent cache that is currently used to store host I/O data. An indication of the compression component in Available Compression Components 168 that is selected by Compression Selection Component 166 is then passed to In-Line Deduplication/Compression Logic 144, as shown in FIG. 1 by Selected Compression Component 164. In-Line Deduplication/Compression Logic 144 then compresses the blocks of host I/O data in Aggregation Set 159 using the compression component in Available Compression Components 168 indicated by Selected Compression Component 164 to obtain a compressed version of the aggregation set In some embodiments, Compression Selection Component 166 may select one of the compression components in Available Compression Components 168 to be used to compress the blocks of host I/O data in Aggregation Set 159 at least in part based on whether or not the value of Overwrite Indication 162 indicates that the blocks of host I/O data in Aggregation Set 159 are an overwrite of previously stored host I/O data. For example, individual compression components in Available Compression Components 168 may each be associated with an indication of whether or not they can be selected to compress host I/O data in Aggregation Set 159 when the host I/O data in Aggregation Set 159 is an overwrite of previously stored host I/O data. In such embodiments, when the host I/O data in Aggregation Set 159 is an overwrite of previously stored host I/O data, Compression Selection Component 166 only selects compression components in Available Compression Components 168 that are associated with an indication that they can be selected to compress host I/O data in Aggregation Set 159 when the host I/O data in Aggregation Set 159 is an overwrite of previously stored host I/O data.

In another example, individual compression components in Available Compression Components 168 may each be associated with an indication of whether or not they can be selected to compress host I/O data in Aggregation Set 159 when the host I/O data in Aggregation Set 159 is an initial write of host I/O data to a set of blocks within a data object to which host I/O data has not previously written by a host. In such embodiments, when the host I/O data in Aggregation Set 159 is an initial write of host I/O data to a set of blocks within a data object to which host I/O data has not previously written by a host, Compression Selection Component 166 only selects compression components in Available Compression Components 168 that are associated with an indication that they can be selected to compress host I/O data in Aggregation Set 159 when the host I/O data in Aggregation Set 159 is an initial write of host I/O data to a set of blocks within a data object to which host I/O data has not previously written by a host.

In some embodiments, In-Line Encryption Logic 146 may perform in-line encryption of compressed data that is generated by In-Line Deduplication/Compression Logic 144. The encryption performed may be data object specific. The specific type of encryption performed may, for example, consist of or include symmetric-key encryption, in which the same key may be used for both encryption and decryption, and/or asymmetric-key encryption, in which different keys are used for encryption and decryption.

Lower-Deck File Systems 150 organize and incorporate the compressed and potentially encrypted data into the Storage 180, using slices of non-volatile storage in Storage 180 that are provisioned from Storage Pool 152, as further illustrated in FIG. 2.

FIG. 2 is a block diagram showing an example of Available Compression Components 168 and associated Compression Component Attributes 200 in some embodiments. In the example of FIG. 2, Available Compression Components 168 includes Compression Component 1 170, Compression Component 2 172, and so on through Compression Component N 174. Further in the example of FIG. 2, each one of Compression Components 168 has a unique persistent cache fullness threshold, and the persistent cache fullness thresholds are assigned to individual compression components such that compression components that provide greater amounts of compression are assigned lower persistent cache fullness thresholds. The compression components in the Available Compression Components 168 of FIG. 2 are ordered by decreasing compression ratios, such that Compression Component 1 170 implements a compression algorithm with the highest compression ratio of any compression component in Available Compression Components 168, and Compression Component N 174 implements a compression algorithm with the lowest compression ratio of any compression component in Available Compression Components 168. Persistent cache fullness thresholds are associated with individual compression components in Available Compression Components 168 in FIG. 2 in ascending levels of persistent cache fullness, e.g. Compression Component 1 170 is associated with a persistent cache fullness threshold of 0%, Compression Component 2 172 is associated with a persistent cache fullness threshold of 50%, and so on to Compression Component N 174, which is associated with a persistent cache fullness threshold of 90%. During an example of operation of the disclosed technology with reference to the example of the Available Compression Components 168 shown in FIG. 2, in a use case in which Compression Component 1 170, Compression Component 2 172, and Compression Component N 174 are the only compression components in Available Compression Components 168, Compression Selection Component 166 selects Compression Component 1 170 in response to values of Current Fullness Level 160 that indicate that Persistent Cache 142 is from 0% to 49% full, Compression Selection Component 166 selects Compression Component 2 172 in response to values of Current Fullness Level 160 that indicate that Persistent Cache 142 is from 50% to 89% full, and Compression Selection Component 166 selects Compression Component N 174 in response to values of Current Fullness Level 160 that indicate that Persistent Cache 142 is from 90% to 100% full. In this way, different compression components may be selected and used to compress host I/O data flushed from Persistent Cache 142 in response to different corresponding ranges of current fullness levels of Persistent Cache 142.

As also shown in the example of FIG. 2, Compression Component Attributes 200 may also include indications of whether individual compression components in Available Compression Components 168 can be selected to compress host I/O data in Aggregation Set 159 when the host I/O data in Aggregation Set 159 is an overwrite of previously stored host I/O data. In the example of FIG. 2, Compression Component 1 170, Compression Component 2 172, and Compression Component N 174 are all associated with an indication ("Y") that they can be selected when the host I/O data in Aggregation Set 159 is an overwrite of previously stored host I/O data. Further in the example of FIG. 2, Compression Component 1 170 and Compression Component 2 172 are associated with an indication ("Y") that they can be selected when the host I/O data in Aggregation Set 159 is an initial write of host I/O data to a set of blocks within a data object to which host I/O data has not previously written by a host. Also in the example of FIG. 2, Compression Component N 174 is associated with an indication ("N") that it cannot be selected when the host I/O data in Aggregation Set 159 is an initial write of host I/O data to a set of blocks within a data object to which host I/O data has not previously written by a host.

The individual compression components in Available Compression Components 168 may implement a variety of different compression algorithms. For example, in some embodiments, Available Compression Components 168 may include one or more compression components that implement what is generally referred to as the LZ77 lossless data compression algorithm, in order to provide at least one compression component with a relatively low compression ratio. For example, Available Compression Components 168 may include multiple compression components that implement multiple, different variations of LZ77 lossless data compression, in order to provide compression components across a range of relatively low associated compression ratios. In addition, Available Compression Components 168 may further include one or more compression components that implement what is generally referred to as the LZH lossless data compression algorithm, which is derived from LZ77 lossless data compression and that additionally uses what is generally referred to as Huffman coding to generate the compressed data, in order to provide at least one compression component with a relatively high compression ratio. For example, Available Compression Components 168 may include multiple compression components that implement multiple, different variations of LZH lossless data compression, in order to provide compression components across a range of relatively high associated compression ratios.

Figure 3:
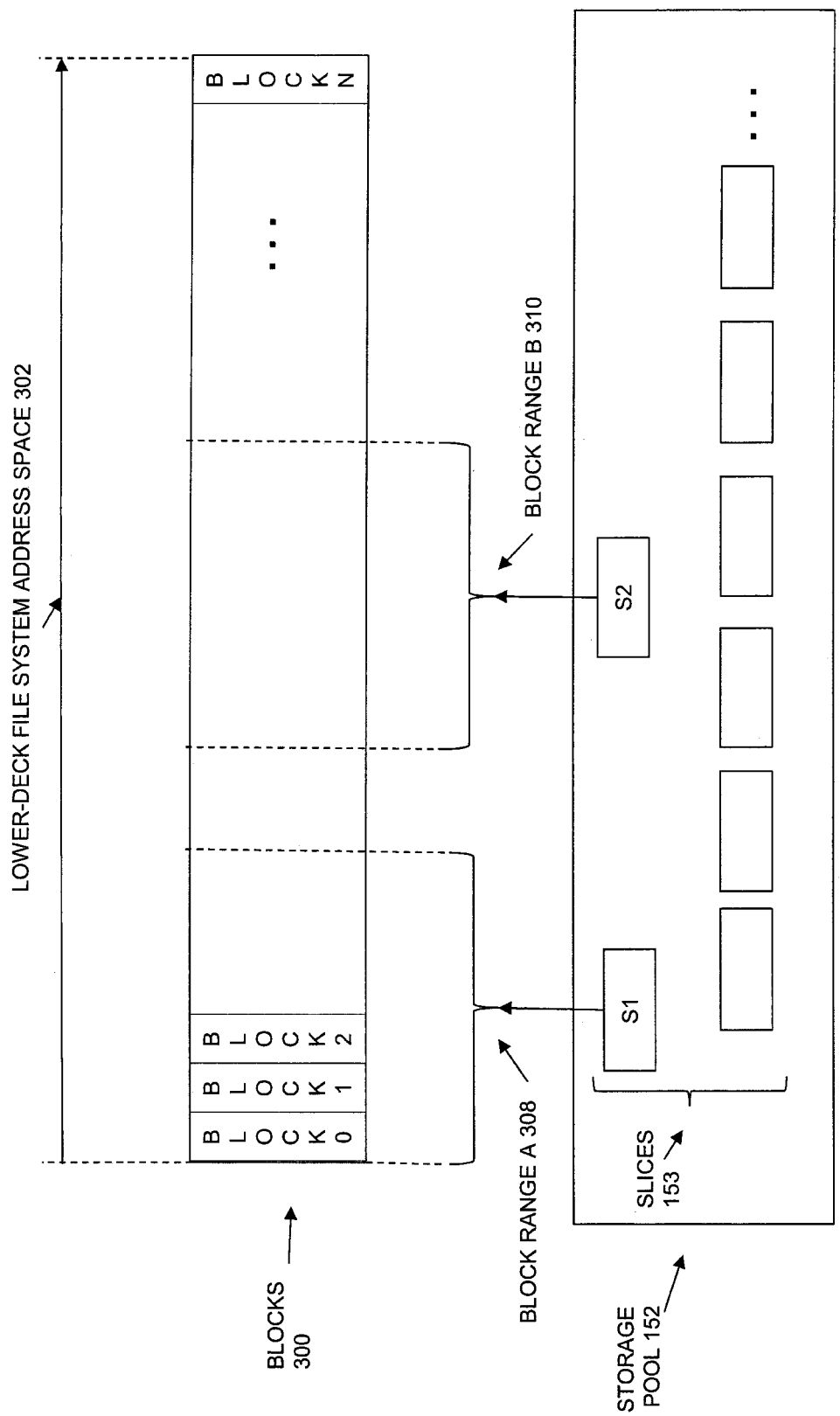
FIG. 3 is a block diagram showing an example of how blocks of addresses may be provided within an address space of a lower-deck file system, and showing an example of how blocks within the address space of the lower-deck file system may correspond to slices of non-volatile storage that are provisioned from one or more non-volatile storage devices that are used to store the blocks of host I/O data written to the corresponding blocks of the lower-deck file system address space.

FIG. 3 is a block diagram showing an example of blocks within an address space of a file system in Lower-Deck File Systems 150, and showing examples of ranges of blocks within the address space of the file system, each of the block ranges corresponding to at least a portion of a slice of storage provisioned from a non-volatile storage device that is used to store the contents of the blocks of the address space within the respective block range. In the example of FIG. 3, Blocks 300 (e.g. Block 0 through Block N) are provided within a File System Address Space 302 of one of the file systems in Lower-Deck File Systems 150. The file system organizes units of non-volatile storage (e.g. slices of disk storage) that are allocated from Storage 180 to the file system through the shared Storage Pool 152, e.g. using a storage pool manager process or the like executing on Storage Processor 120. Similarly, the file system may operate to return units of non-volatile storage to the shared Storage Pool 152 when such non-volatile storage is no longer needed. The Storage Pool 152 organizes elements of the Storage 180 into Slices 153. A "slice" is an example of a unit of storage space (e.g. 256 megabytes or 1 gigabytes in size), which is derived from Storage 180. In the example of FIG. 3, at least a portion of the slice S1 has been allocated from Storage Pool 152 to provide non-volatile storage for the host data stored within the blocks of the File System Address Space 302 that are located within Block Range A 308, and at least a portion of the slice S2 has been allocated from Storage Pool 152 to provide non-volatile storage for the host data stored within the blocks of the File System Address Space 302 that are located within Block Range B 310.

Figure 4:
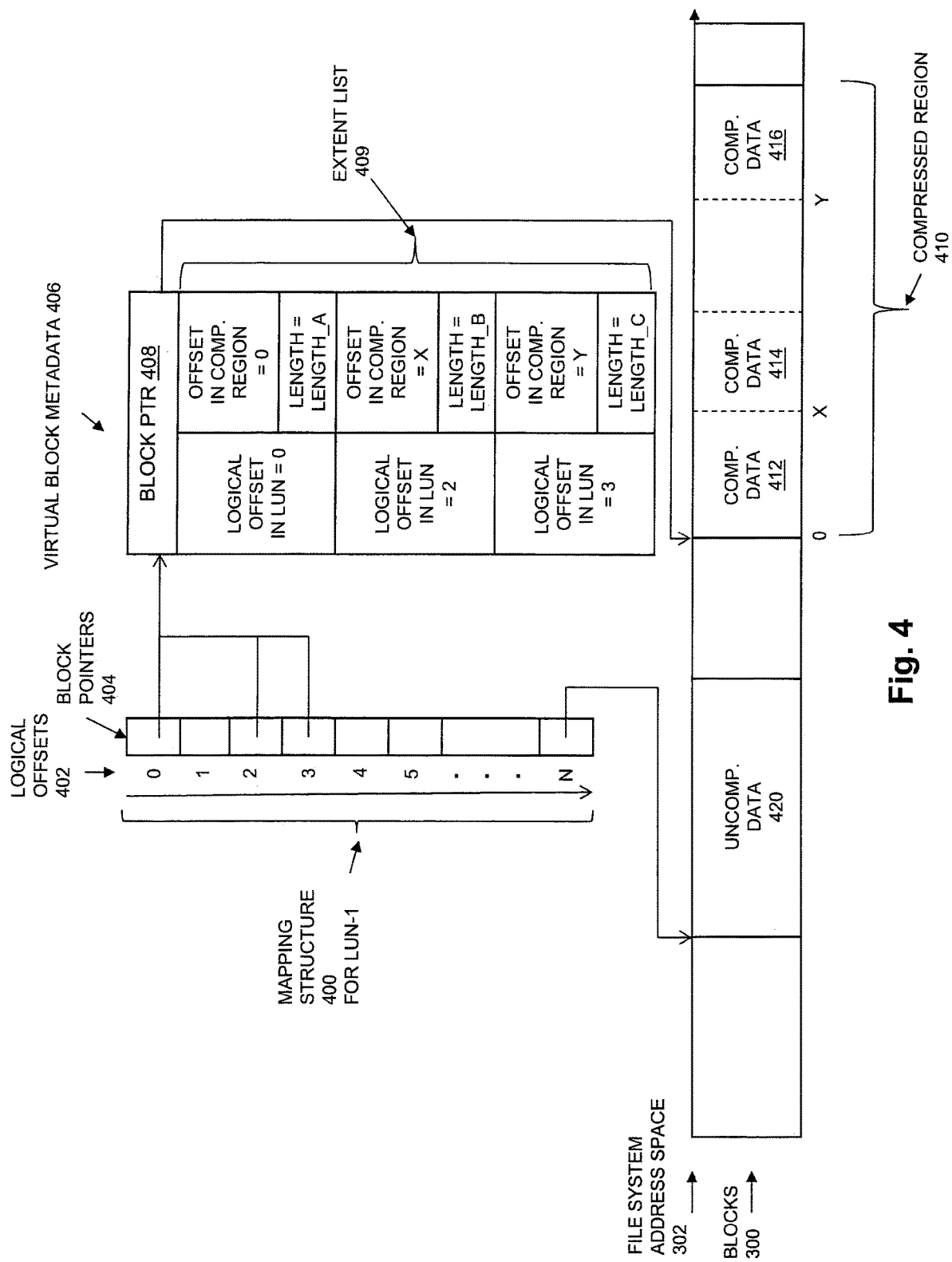
FIG. 4 is a block diagram showing an example of blocks of host data stored within the file system address space, and of a mapping structure for a data object and associated metadata that may be used to indicate locations within the address space of the lower-deck file system at which compressed and/or uncompressed extents of host data may be stored.

FIG. 4 is a block diagram showing an example of compressed host I/O data stored within the file system address space. The example of FIG. 4 shows a lower deck file system mapping structure for a file that implements a data object, and metadata associated with the mapping structure that may be used to indicate locations within the address space of the lower-deck file system at which compressed and/or uncompressed extents of host I/O data are located that correspond to block offsets within the file. In the example of FIG. 4, a Mapping Structure 400 (e.g. within an inode structure) for a file that implements a LUN data object LUN-1 in the Lower Deck File Systems 150 is indexed (e.g. by components in I/O Stack 140) using Logical Offsets 402, in order to store and/or access specific blocks of host data within LUN-1. Each one of Logical Offsets 402 corresponds to one of the Block Pointers 404 in the Mapping Structure 400. Each one of Block Pointers 404 maps a block within the file that implements LUN-1 to a location within the File System Address Space 302 at which is stored the host data for that block. Accordingly, a pointer in Block Pointers 404 corresponding to logical offset zero maps I/O requests that indicate the block at logical offset zero of the file that implements LUN-1 to a location within the File System Address Space 302 at which is stored the host data for block zero of the file that implements LUN-1, a pointer in Block Pointers 404 corresponding to logical offset one maps I/O requests that indicate the block at logical offset one of the file that implements LUN-1 to a location within the File System Address Space 302 that stores the host data for block one of the file that implements LUN-1, and so on. In the case of blocks of uncompressed host data, a corresponding pointer in Block Pointers 404 points directly to the location of the uncompressed data within the File System Address Space 302. For example, as shown in FIG. 4, in the case where block N of the file that implements LUN-1 has not been compressed, the pointer in Block Pointers 404 corresponding to logical offset N points directly to the location in File System Address Space 302 of Uncompressed Data 420.

In the case of a compressed block of host data within the file that implements LUN-1, a corresponding pointer in Block Pointers 404 points to virtual block metadata that indicates the location of the compressed data within a region of compressed data in the File System Address Space 302. In the example of FIG. 4, Compressed Region 410 is a region of compressed data within the File System Address Space 302. Compressed Region 410 contains multiple extents of previously compressed host I/O data. Virtual Block Metadata 406 is a data structure in the Lower Deck File Systems 150 that stores a Block Pointer 408 indicating the location of the Compressed Region 410 within the File System Address Space 302. Virtual Block Metadata 406 also stores an Extent List 409 having multiple entries. Each entry in the Extent List 409 indicates a logical offset into the Compressed Region 410 at which is located an extent of compressed data that was generated from a specific block of host data in the file that implements LUN-1. Each extent entry also stores a length of the extent of compressed data indicated by that extent entry, and may also store other metadata describing the extent of compressed data that is indicated by the extent entry (e.g. the specific compression algorithm used to compress the extent, whether the extent is encrypted and if so the type of encryption used, etc.). In the example of FIG. 4, the block pointers for the logical offsets 0, 2, and 3 indicate Virtual Block Metadata 406, since host I/O data has previously been written to the blocks at offsets 0, 2 and 3 of the file that implements LUN-1, and accordingly has been compressed and stored when it was flushed from the Persistent Cache 142. The Extent List 409 indicates that the compressed host I/O data previously written to the block at logical offset 0 of the file that implements LUN-1 is located beginning at offset 0 of Compressed Region 410, and has a length of LENGTH_A, as shown by Compressed Data 412. Also in the example of FIG. 4, the Extent List 409 indicates that the compressed host I/O data previously written to the block at logical offset 2 of the file that implements LUN-1 is located beginning at offset X of Compressed Region 410, and has a length of LENGTH_B, as shown by Compressed Data 414. Further in the example of FIG. 4, the Extent List 409 indicates that the compressed host I/O data previously written to the block at logical offset 3 of the file that implements LUN-1 is located beginning at offset Y of Compressed Region 410, and has a length of LENGTH_C, as shown by Compressed Data 316.

In some embodiments of the disclosed technology, In-Line Deduplication/Compression Logic 144 may determine whether the blocks of host I/O data in the Aggregation Set 159 contain host I/O data that is an overwrite of host I/O data previously flushed from the persistent cache to a lower deck file system. For example, in the case where Aggregation Set 159 includes host I/O data directed to the block at logical offset 0 of the file that implements LUN-1, In-Line Deduplication/Compression Logic 144 may inspect the block pointer in Block Pointers 404 corresponding to logical offset 0 in LUN-1, and determine that host I/O data directed to the block at logical offset 0 of the file that implements LUN-1 is an overwrite of host I/O data previously flushed from the persistent cache to a lower deck file system since the contents of Virtual Block Metadata 406 indicates that a compressed version of host I/O data previously written to the block at logical offset 0 of the file that implements LUN-1 is currently stored at offset 0 of Compressed Region 410, and has a length of LENGTH_A. In such a case, the Aggregation Set 159 contains host I/O data that is an overwrite of host I/O data previously flushed form the persistent cache to a lower deck file system.

Otherwise, in another example, in the case where Aggregation Set 159 includes host I/O data directed to the block at logical offset 1 of the file that implements LUN-1, In-Line Deduplication/Compression Logic 144 may inspect the block pointer in Block Pointers 404 corresponding to logical offset 1 in LUN-1, and determine that the host I/O data directed to the block at logical offset 1 of the file that implements LUN-1 is an initial write of host I/O data to a block in LUN-1 that has not previously been written by a host, since the block pointer in Block Pointers 404 corresponding to logical offset 1 in LUN-1 does not point to any previously stored compressed data. In such a case, the Aggregation Set 159 contains host I/O data that is not an overwrite of host I/O data previously flushed form the Persistent Cache 142 to a lower deck file system.

In response to determining that the blocks of host I/O data in the aggregation set contain host I/O data that is not an overwrite of host I/O data previously flushed from the persistent cache to a lower deck file system, In-Line Deduplication/Compression Logic 144 may allocate a new extent of blocks within the File System Address Space 302, within the Compressed Region 410, and add an entry for the new extent to the Extent List 409, including the offset and length of the newly allocated extent. The compressed version of the host I/O data from the Aggregation Set 159 may then be stored to the non-volatile storage corresponding to the newly allocated extent of blocks in the Compressed Region 410 within the File System Address Space 302 of the lower deck file system.

In some embodiments, also in response to determining that the blocks of host I/O data in the aggregation set contain host I/O data that is not an overwrite of host I/O data previously flushed from the persistent cache to a lower deck file system, a length of the compressed version of the host I/O data contained in the Aggregation Set 159 may be determined, e.g. by the In-Line Deduplication/Compression Logic 144, and allocation of the new extent of blocks within the Compressed Region 410 may include allocating an extent of blocks in the address space of the lower deck file system that has a length that is greater than the length of the compressed version of the aggregation set. The length of the newly allocated extent of blocks may be calculated as the larger of i) a value that is a fixed percentage of the length of the uncompressed host I/O data contained in the Aggregation Set 159, e.g. 50% of the length of the uncompressed host I/O data contained in the Aggregation Set 159, or ii) the length of the compressed version of the host I/O data contained in the Aggregation Set 159. In the case where the length of the of the compressed version of the host I/O data contained in the Aggregation Set 159 is less than the fixed percentage of the length of the uncompressed host I/O data contained in the Aggregation Set 159, the length of the newly allocated extent of blocks may be larger than the length of the compressed version of the host I/O data contained in the Aggregation Set 159. In this way, when host I/O data is initially compressed and stored, the length of the extent used to store the compressed data may be calculated to allow for the same extent to be used to store the compressed version of new data that may subsequently overwrite the same location in the data object, even when the compressed version of the new data is larger than the compressed version of the data initially written to that location in the data object. In this way the disclosed technology may advantageously avoid having to allocate a new extent to store a compressed version of overwrite date.

In some embodiments, in response to determining that the blocks of host I/O data in the Aggregation Set 159 contain host I/O data that is an overwrite of host I/O data previously flushed from the Persistent Cache 142 to a lower deck file system, In-Line Deduplication/Compression Logic 144 compares the length the compressed version of the host I/O data contained in the Aggregation Set 159 to a length of the extent in the Compressed Region 410 that was used to store a previous compressed version of the blocks of host I/O data in the aggregation set. For example, in the case where Aggregation Set 159 includes host I/O data directed to the block at logical offset 0 of the file that implements LUN-1, In-Line Deduplication/Compression Logic 144 may compare the length of the compressed version of the host I/O data contained in the Aggregation Set 159 to LENGTH_A.

In response to determining that the length of the compressed version of the host I/O data contained in the Aggregation Set 159 is greater than the length of the previously allocated extent of blocks in the Compressed Region 410 that was used to store the previous compressed version of the blocks of host I/O data in the aggregation set (e.g. that the length of the compressed version of the host I/O data contained in the Aggregation Set 159 is greater than LENGTH_A), In-Line Deduplication/Compression Logic 144 may select a second one of the compression components in Available Compression Components 166, such that the second selected compression component has a higher compression ratio than the initially selected compression component. The In-Line Deduplication/Compression Logic 144 may then use the second selected compression component to recompress the host I/O data contained in the Aggregation Set 159 to obtain a second compressed version of the host I/O data contained in the Aggregation Set 159. In the event that the second compressed version of the I/O data contained in the Aggregation Set 159 is also too large to be stored in the previously allocated extent of blocks in the Compressed Region 410 that was used to store the previous compressed version of the blocks of host I/O data contained in the Aggregation Set 159, In-Line Deduplication/Compression Logic 144 may select still another compression component with an even higher compression ratio than the second selected compression component, to generate another compressed version of host I/O data contained in the Aggregation Set 159, to attempt to fit the newly compressed host I/O data into the previously allocated extent of blocks in the Compressed Region 410, in order to avoid having to allocate a new extent of blocks within the Compressed Region 410 if possible. After some predetermined number of compressions using different ones of the compression components in the Available Compression Components 168, having progressively higher compression ratios, In-Line Deduplication/Compression Logic 144 may allocate a new extent of blocks within the Compressed Region 410 to store the compressed data resulting from compressing the host I/O data contained in the Aggregation Set 159.

Figure 5:
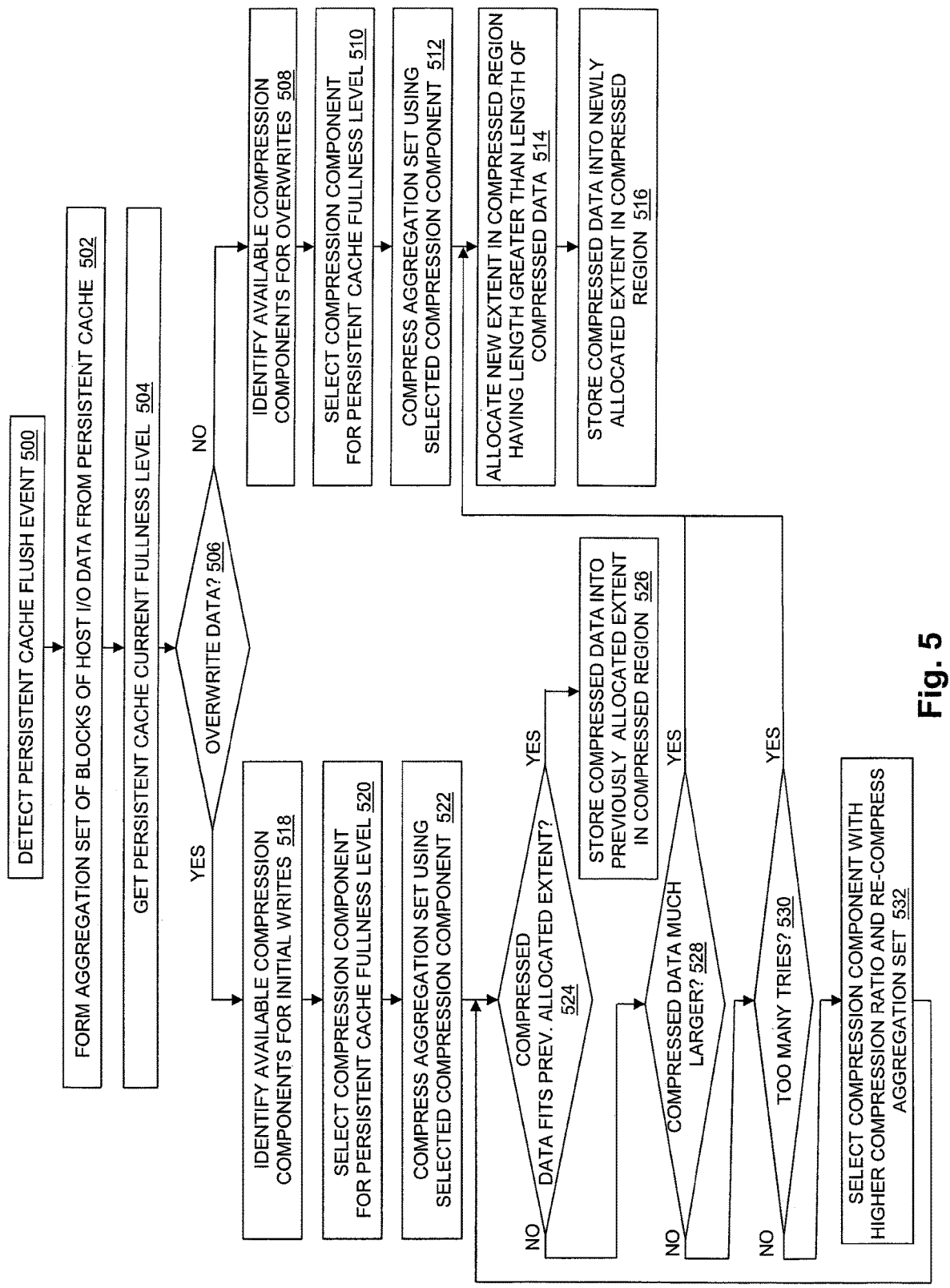
FIG. 5 is a flow chart showing an example of steps performed during operation of some embodiments of the disclosed technology.

FIG. 5 is a flow chart showing an example of steps performed during operation of some embodiments of the disclosed technology.

At step 500, a flush event is detected for a persistent cache located in the storage processor of a data storage system.

At step 502, in response to detection of the flush event, an aggregation set consisting of blocks of host I/O data is formed from host I/O data that had been received by the storage processor from one or more host machines and accumulated in the persistent cache.

At step 504, further in response to detection of the flush event, a fullness level of the persistent cache is determined, indicating how much of the persistent cache is currently being used to store host I/O data received by the storage processor.

At step 506, the disclosed technology determines whether the host I/O data contained in the aggregation set is an overwrite directed to a location within a storage object to which host I/O data was previously written. In the case where the host I/O data contained in the aggregation set is an overwrite directed to a location within a storage object to which host I/O data was previously written, step 506 is followed by step 518. Otherwise, step 506 is followed by step 508.

In step 508, the disclosed technology identifies a set of compression components that are available to be used in the case of host I/O data overwrites. For example, at step 508 a set of multiple compression components may be generated that each have an associated attribute indicating that they can be used in the case of a host I/O data overwrite.

At step 510, a compression component is selected from the set of multiple compression components generated at step 508 that is associated with the current fullness level of the persistent cache, e.g. that is indicated for use with a range of persistent cache fullness levels including the current fullness level of the persistent cache.

At step 512, the host I/O data contained in the aggregation set is compressed using the compression component selected at step 510.

At step 514, a new extent is allocated within a compressed region of an address space of a lower deck file system. The new extent allocated at step 514 may have a length that is greater than the length of the compressed version of the host I/O data contained in the aggregation set.

At step 516, the compressed version of the host I/O contained in the aggregation set is stored into non-volatile storage corresponding to the extent allocated at step 514.

At step 518, the disclosed technology identifies a set of compression components that are available to be used in the case of initial host I/O data writes. For example, at step 518 a set of multiple compression components may be generated that each have an associated attribute indicating that they can be used in the case of an initial host I/O data write.

At step 520, a compression component is selected from the set of multiple compression components generated at step 518 that is associated with the current fullness level of the persistent cache, e.g. that is indicated for use with a range of persistent cache fullness levels including the current fullness level of the persistent cache.

At step 522, the host I/O data contained in the aggregation set is compressed using the compression component selected at step 520.

At step 524, the disclosed technology determines whether the compressed version of the host I/O data contained in the aggregation set fits within a previously allocated extent with a compressed region of an address space of a lower deck file system that was used to store a compressed version of host I/O data previously written to the same location within a data object as the host I/O data contained in the aggregation set. If the compressed version of the host I/O data contained in the aggregation set fits in the previously allocated extent, then step 524 is followed by step 526, in which the compressed version of the host I/O data stored in the aggregation set is stored into non-volatile storage corresponding to the previously allocated extent. Otherwise, step 524 is followed by step 528.

At step 528, the disclosed technology determines whether the compressed version of the host I/O data contained in the aggregation set has a length that exceeds the length of the previously allocated extent by more than a predetermined amount. For example, at step 528 the disclosed technology may determine whether the compressed version of the host I/O data contained in the aggregation set is more than 50% larger than the previously allocated extent. If so, then step 528 is followed by step 514, in which a new extent is allocated in the compressed region of the address space of the lower deck file system for storing of the compressed version of the host I/O data at step 516.

Otherwise, step 528 is followed by step 530, in which the disclosed technology determines whether more than a predetermined maximum number of attempts to compress the host I/O data contained in the aggregation set have been performed without generating a compressed version that would fit within the previously allocated extent. If so, then step 530 is followed by step 514, in which a new extent is allocated in the compressed region of the address space of the lower deck file system for storing of the compressed version of the host I/O data at step 516.

Otherwise, step 530 is followed by step 532, in which a different compression component is selected having a higher compression ratio than the compression component(s) previously used to compress the host I/O data contained in the aggregation set, and is used to re-compress the host I/O data contained in the aggregation set. Step 532 is followed by step 524.

Figure 6:
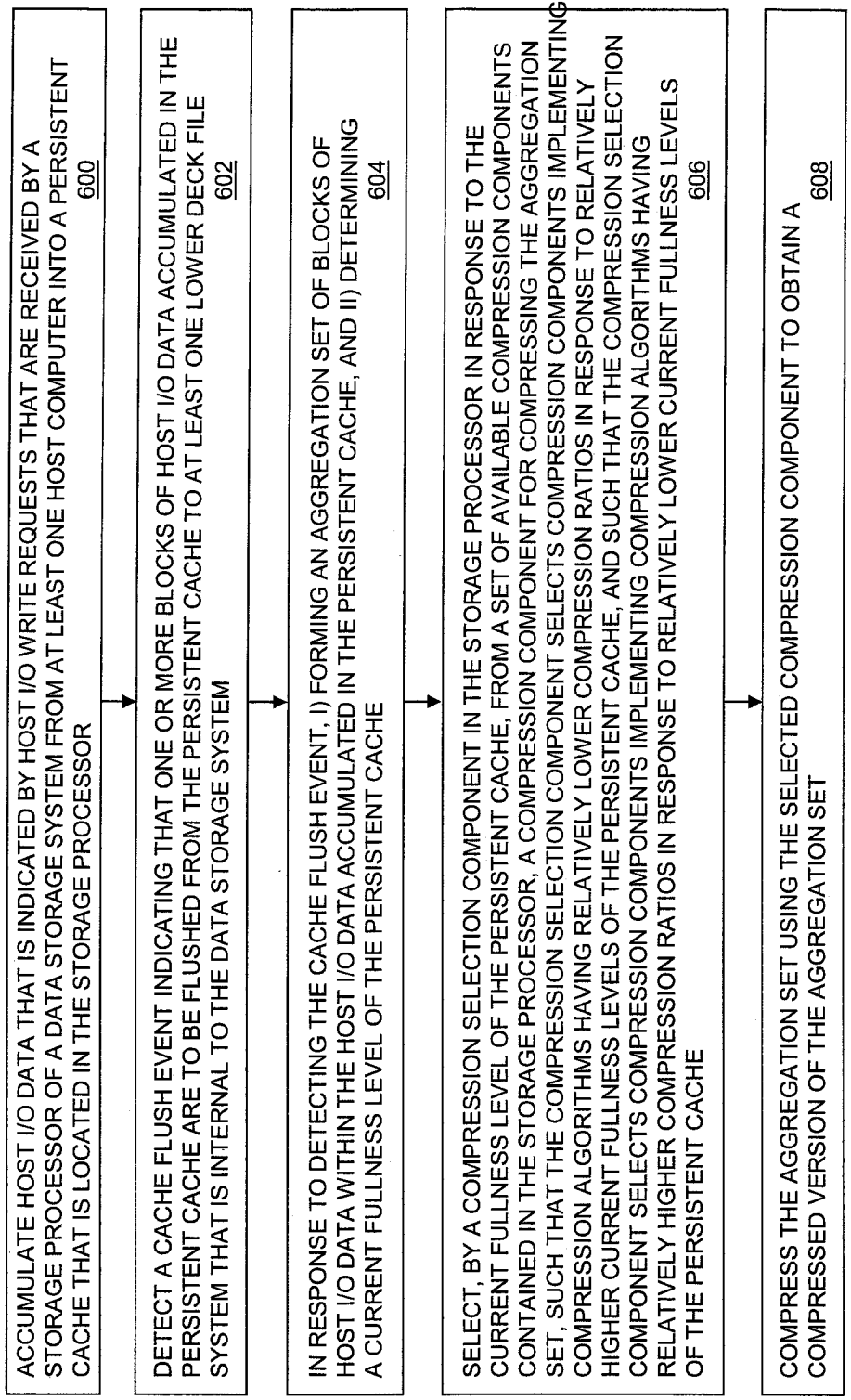
FIG. 6 is a flow chart showing an example of steps performed during operation of some embodiments of the disclosed technology.

FIG. 6 is a flow chart showing an example of steps performed during operation of some embodiments of the disclosed technology.

At step 600, host I/O data that is indicated by host I/O write requests that are received by a storage processor of a data storage system from at least one host computer is accumulated into a persistent cache that is located in the storage processor.

At step 602, a cache flush event is detected that indicates that one or more blocks of the host I/O data accumulated in the persistent cache are to be flushed from the persistent cache to at least one lower deck file system that is internal to the data storage system.

At step 604, in response to detection of the cache flush event, i) an aggregation set is formed of blocks of host I/O data within the host I/O data accumulated in the persistent cache, and ii) a current fullness level of the persistent cache is determined.

At step 606 a compression selection component in the storage processor selects, in response to the current fullness level of the persistent cache, from a set of available compression components contained in the storage processor, a compression component for compressing the host I/O data contained in the aggregation set. The compression selection component selects compression components implementing compression algorithms having relatively lower compression ratios in response to relatively higher current fullness levels of the persistent cache, and selects compression components implementing compression algorithms having relatively higher compression ratios in response to relatively lower current fullness levels of the persistent cache.

At step 608, the host I/O data contained in the aggregation set is compressed using the selected compression component to obtain a compressed version of the aggregation set.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing data compression in a storage processor of a data storage system, comprising the steps of:
in response to detecting a cache flush event by detecting that a predetermined time period has expired since host I/O data was previously stored into a persistent cache located in the storage processor, i) forming an aggregation set of blocks of host I/O data within host I/O data accumulated in the persistent cache, wherein the aggregation set is a set of oldest blocks of host I/O data that are stored in the persistent cache, and ii) determining a current fullness level of the persistent cache, wherein the current fullness of the persistent cache comprises a current percentage of a total size of the persistent cache that is currently used to store host I/O data;
selecting, by a compression selection component in the storage processor in response to the current fullness level of the persistent cache, from a set of available compression components contained in the storage processor, a compression component for compressing the aggregation set, wherein the compression selection component selects compression components implementing compression algorithms having relatively lower compression ratios in response to relatively higher current fullness levels of the persistent cache, and wherein the compression selection component selects compression components implementing compression algorithms having relatively higher compression ratios in response to relatively lower current fullness levels of the persistent cache; and
compressing the aggregation set using the selected compression component to obtain a compressed version of the aggregation set.

2. The method of claim 1, further comprising:
accumulating host I/O data that is indicated by host I/O write requests that are received by the storage processor from at least one host computer into the persistent cache that is located in the storage processor; and
wherein the cache flush event indicates that a plurality of blocks of host I/O data accumulated in the persistent cache are to be flushed from the persistent cache to at least one lower deck file system that is internal to the data storage system.

3. The method of claim 2, wherein selecting the compression component comprises selecting one of the compression components in the set of available compression components having the highest associated persistent cache fullness threshold that is less than or equal to the current fullness level of the persistent cache.

4. The method of claim 3, wherein determining the current fullness level of the persistent cache comprises determining a current percentage of the total size of the persistent cache that is currently used to store host I/O data; and
wherein selecting the compression component comprises selecting one of the compression components in the set of available compression components in the set of available compression components having the highest associated persistent cache fullness threshold that is less than or equal to the current percentage of the total size of the persistent cache that is currently used to store host I/O data.

5. The method of claim 4, wherein each one of the compression components in the set of available compression components is associated with a different persistent cache fullness threshold.

6. The method of claim 5, further comprising:
determining whether the blocks of host I/O data in the aggregation set contain host I/O data that is an overwrite of host I/O data previously flushed from the persistent cache to at least one lower deck file system that is internal to the data storage system;
in response to determining that the blocks of host I/O data in the aggregation set contain host I/O data that is not an overwrite of host I/O data previously flushed from the persistent cache to at least one lower deck file system that is internal to the data storage system, allocating an extent of blocks in an address space of a lower deck file system within a compressed region of the address space of the lower deck file system; and
storing the compressed version of the aggregation set to non-volatile storage corresponding to the extent of blocks in the address space of the lower deck file system.

7. The method of claim 6, further comprising:
determining a length of the compressed version of the aggregation set; and
wherein allocating the extent of blocks in the address space of the lower deck file system within the compressed region of the address space of the lower deck file system comprises allocating an extent of blocks in the address space of the lower deck file system having length that is greater than the length of the compressed version of the aggregation set.

8. The method of claim 5, further comprising:
determining whether the blocks of host I/O data in the aggregation set contain host I/O data that is an overwrite of host I/O data previously flushed from the persistent cache to at least one lower deck file system that is internal to the data storage system;
in response to determining that the blocks of host I/O data in the aggregation set contain host I/O data that is an overwrite of host I/O data previously flushed from the persistent cache to at least one lower deck file system that is internal to the data storage system, comparing a length the compressed version of the aggregation set to a length of an extent of blocks in an address space of a lower deck file system within a compressed region of the address space of the lower deck file system that was used to store a previous compressed version of the blocks of host I/O data in the aggregation set; and
in response to determining that the length the compressed version of the aggregation set is greater than the length of an extent of blocks in an address space of the lower deck file system within the compressed region of the address space of the lower deck file system that was used to store the previous compressed version of the blocks of host I/O data in the aggregation set, selecting a second compression component for compressing the aggregation set, wherein the second selected compression component has a higher compression ratio than the initially selected compression component; and
recompressing the aggregation set using the second selected compression component to obtain a second compressed version of the aggregation set.

9. The method of claim 5, wherein the lower deck file system maps files to blocks in an address space of the lower deck file system, wherein each file implements a corresponding data object that is accessible to the at least one host computer, and wherein blocks in the address space of the lower deck file system also correspond to non-volatile storage provisioned from a set of storage devices in the data storage system that provide storage for the lower deck file system.

10. A storage processor in a data storage system, the storage processor including a set of processing units and memory, coupled to the set of processing units, the memory storing instructions for providing data compression in the storage processor, wherein the instructions, when executed by the set of processing units, cause the set of processing units to:
in response to detection of a cache flush event by detecting that a predetermined time period has expired since host I/O data was previously stored into a persistent cache located in the storage processor, i) form an aggregation set of blocks of host I/O data within host I/O data accumulated in the persistent cache, wherein the aggregation set is a set of oldest blocks of host I/O data that are stored in the persistent cache, and ii) determine a current fullness level of the persistent cache, wherein the current fullness of the persistent cache comprises a current percentage of a total size of the persistent cache that is currently used to store host I/O data;
select, by a compression selection component in the storage processor in response to the current fullness level of the persistent cache, from a set of available compression components contained in the storage processor, a compression component for compressing the aggregation set, wherein the compression selection component selects compression components implementing compression algorithms having relatively lower compression ratios in response to relatively higher current fullness levels of the persistent cache, and wherein the compression selection component selects compression components implementing compression algorithms having relatively higher compression ratios in response to relatively lower current fullness levels of the persistent cache; and
compress the aggregation set using the selected compression component to obtain a compressed version of the aggregation set.

11. The storage processor of claim 10, wherein the instructions, when executed by the set of processing units, further cause the processing units to:
accumulate host I/O data that is indicated by host I/O write requests that are received by the storage processor from at least one host computer into the persistent cache that is located in the storage processor; and
wherein the cache flush event indicates that a plurality of blocks of host I/O data accumulated in the persistent cache are to be flushed from the persistent cache to at least one lower deck file system that is internal to the data storage system.

12. The storage processor of claim 11, wherein the instructions, when executed by the set of processing using to select the compression component, further cause the processing units to select one of the compression components in the set of available compression components having the highest associated persistent cache fullness threshold that is less than or equal to the current fullness level of the persistent cache.

13. The storage processor of claim 12, wherein the instructions, when executed by the set of processing units, cause the set of processing units to determine the current fullness level of the persistent cache by determining a current percentage of the total size of the persistent cache that is currently used to store host I/O data; and
wherein the instructions, when executed by the set of processing units, cause the processing units to select the compression component by selecting one of the compression components in the set of available compression components in the set of available compression components having the highest associated persistent cache fullness threshold that is less than or equal to the current percentage of the total size of the persistent cache that is currently used to store host I/O data.

14. The storage processor of claim 13, wherein each one of the compression components in the set of available compression components is associated with a different persistent cache fullness threshold.

15. The storage processor of claim 14, wherein the instructions, when executed by the set of processing units, further cause the processing units to:
determine whether the blocks of host I/O data in the aggregation set contain host I/O data that is an overwrite of host I/O data previously flushed from the persistent cache to at least one lower deck file system that is internal to the data storage system;

in response to a determination that the blocks of host I/O data in the aggregation set contain host I/O data that is not an overwrite of host I/O data previously flushed from the persistent cache to at least one lower deck file system that is internal to the data storage system, allocate an extent of blocks in an address space of a lower deck file system within a compressed region of the address space of the lower deck file system; and store the compressed version of the aggregation set to non-volatile storage corresponding to the extent of blocks in the address space of the lower deck file system.

16. The storage processor of claim 15, wherein the instructions, when executed by the set of processing units, further cause the processing units to:

determine a length of the compressed version of the aggregation set; and allocate the extent of blocks in the address space of the lower deck file system within the compressed region of the address space of the lower deck file system at least in part by allocating an extent of blocks in the address space of the lower deck file system having length that is greater than the length of the compressed version of the aggregation set.

17. The storage processor of claim 14, wherein the instructions, when executed by the set of processing units, further cause the processing units to:

determine whether the blocks of host I/O data in the aggregation set contain host I/O data that is an overwrite of host I/O data previously flushed from the persistent cache to at least one lower deck file system that is internal to the data storage system;

in response to determining that the blocks of host I/O data in the aggregation set contain host I/O data that is an overwrite of host I/O data previously flushed from the persistent cache to at least one lower deck file system that is internal to the data storage system, compare a length the compressed version of the aggregation set to a length of an extent of blocks in an address space of a lower deck file system within a compressed region of the address space of the lower deck file system that was used to store a previous compressed version of the blocks of host I/O data in the aggregation set; and in response to determining that the length the compressed version of the aggregation set is greater than the length of an extent of blocks in an address space of the lower deck file system within the compressed region of the address space of the lower deck file system that was used to store the previous compressed version of the blocks of host I/O data in the aggregation set, select a second compression component for compressing the aggregation set, wherein the second selected compression component has a higher compression ratio than the initially selected compression component; and recompress the aggregation set using the second selected compression component to obtain a second compressed version of the aggregation set.

18. The storage processor of claim 14, wherein the lower deck file system maps files to blocks in an address space of the lower deck file system, wherein each file implements a corresponding data object that is accessible to the at least one host computer, and wherein blocks in the address space of the lower deck file system also correspond to non-volatile storage provisioned from a set of storage devices in the data storage system that provide storage for the lower deck file system.

19. A non-transitory, computer-readable medium including instructions which, when executed by a set of processing units of in a storage processor in a data storage system, cause the set of processing units to perform a method of data compression in the storage processor, the method comprising the steps of:

in response to detecting a cache flush event by detecting that a predetermined time period has expired since host I/O data was previously stored into a persistent cache located in the storage processor, i) forming an aggregation set of blocks of host I/O data within host I/O data accumulated in the persistent cache, wherein the aggregation set is a set of oldest blocks of host I/O data that are stored in the persistent cache, and ii) determining a current fullness level of the persistent cache, wherein the current fullness of the persistent cache comprises a current percentage of a total size of the persistent cache that is currently used to store host I/O data;

selecting, by a compression selection component in the storage processor in response to the current fullness level of the persistent cache, from a set of available compression components contained in the storage processor, a compression component for compressing the aggregation set, wherein the compression selection component selects compression components implementing compression algorithms having relatively lower compression ratios in response to relatively higher current fullness levels of the persistent cache, and wherein the compression selection component selects compression components implementing compression algorithms having relatively higher compression ratios in response to relatively lower current fullness levels of the persistent cache; and compressing the aggregation set using the selected compression component to obtain a compressed version of the aggregation set.

20. The method of claim 1, further comprising:

wherein forming the aggregation set comprises selecting, as the aggregation set, the set of oldest blocks of host I/O data that are stored in the persistent cache.

21. The method of claim 1, further comprising:

selecting compression components that implement a first compression algorithm having relatively lower compression ratios in response to relatively higher currently fullness levels of the persistent cache; and selecting compression components that implement a second compression algorithm different from the first compression algorithm and having relatively higher compression ratios in response to relatively lower currently fullness levels of the persistent cache.

* * * * *